March 24, 1970

R. FREEMAN 3,502,964

GYROMAGNETIC RESONANCE SPECTROMETER EMPLOYING A TEMPERATURE
DEPENDENT RESONANCE LINE TO SENSE
TEMPERATURE OF THE SAMPLE

Filed July 28, 1967

INVENTOR.
RAYMOND FREEMAN
BY
Wm J Nolan
ATTORNEY

INVENTOR.
RAYMOND FREEMAN

United States Patent Office 3,502,964
Patented Mar. 24, 1970

3,502,964
GYROMAGNETIC RESONANCE SPECTROMETER EMPLOYING A TEMPERATURE DEPENDENT RESONANCE LINE TO SENSE TEMPERATURE OF THE SAMPLE
Raymond Freeman, Menlo Park, Calif., assignor to Varian Associates, Palo Alto, Calif., a corporation of California
Filed July 28, 1967, Ser. No. 656,711
Int. Cl. G01r 33/08
U.S. Cl. 324—.5
4 Claims

ABSTRACT OF THE DISCLOSURE

A gyromagnetic resonance spectrometer is disclosed which employs a temperature dependent resonance line of a gyromagnetic resonance group disposed in heat exchanging relation with the sample under analysis for sensing the temperature of the sample to derive an indication that may be utilized for controlling the temperature of the sample.

Description of the prior art

Heretofore, gyromagnetic resonance spectrometers have empolyed a conventional temperature sensing element such as a platinum resistor disposed within the probe structure about one inch below the sample under analysis. A heating element was employed for controlling the temperature of the sample by means of an air stream flowing over the heating element, the sensing element, and thence around the sample container. The temperature of the sample, as sensed by the sensing element, was controlled by feeding the temperature signal derived from the sensing element to a bridge circuit for comparison with a reference signal to derive an error signal for controlling the temperature of the heater and, thus, the sample. The problem with this prior art arrangement was that the sensing element could not be disposed sufficiently close to the sample to obtain an accurate temperature reading of the sample itself. Thus, the temperature as sensed was often different than the temperature of the sample. It is desired to obtain a more accurate measurement of the precise temperature of the sample under analysis.

Summary of the present invention

The principal object of the present invention is the provision of an improved gyromagnetic resonance spectrometer employing temperature control of the sample.

One feautre of the present invention is the provision of a gyromagnetic resonance spectrometer including a temperature dependent resonance sample disposed in heat exchanging relation with the sample under analysis for sensing the temperature of the sample, whereby a precise indication of the temperature of the sample is obtained.

Another feautre of the present invention is the same as the preceding feautre including the provision of a field-frequency control lock for stabilizing the ratio of the frequency of the resonance exciting alternating magnetic fields to the intensity of the polarizing magnetic field, whereby measurements of temperature dependent shifts in the resonance of the temperature reference group are more precisely determined.

Another feature of the present invention is the same as the preceding feature wherein resonance of the temperature reference group is compared with resonance of the field-frequency reference group to obtain an output determinative of the temperature of the sample under analysis.

Another feature of the present invention is the same as any one or more of the preceding features wherein a resonance determinative frequency of the temperature reference group is compared with a reference frequency to derive an error signal for controlling the temperature of the sample under analysis, whereby a closed loop temperature control of the sample under analysis is obtained.

Another feature of the present invention is the same as any one or more of the preceding feautres wherein modulation of the polarizing field is employed for exciting resonance of the temperature reference group, a field-frequency control group, and the sample under analysis, whereby a comparison of the resonance of the temperature reference group with the field-frequency reference group is facilitated.

Other features and advantages of the present invention will become apparent upon a perusal of the following specification taken in connection with the accompanying drawings wherein:

Description of the preferred embodiments

Figure 1:
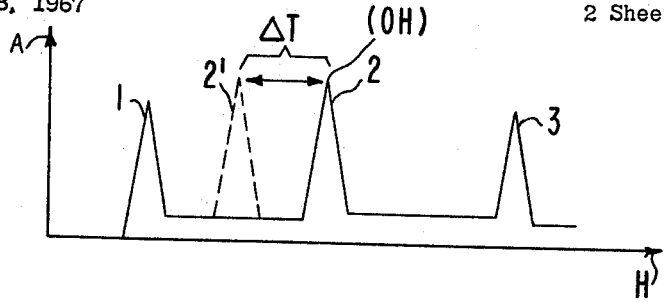
FIG. 1 is a spectrum of a gyromagnetic resonance of a sample depicting a temperature dependent shift in a resonance frequency of one of the groups within the sample.

Referring now to FIG. 1 there is shown a typical gyromagnetic resonance spectrum obtained from a gyromagnetic resonance spectrometer. The spectrum includes resonance lines 1, 2, and 3 obtained from a sample at a given temperature. When the same spectrum is run at a temperature different from the initial spectrum by $\Delta T$, the spectrum will be substantially the same as that shown in FIG. 1 except that the second resonance line 2, which is temperature dependent, will have moved to a second position in the spectrum as indicated by the dotted lines and identified as 2'. Typical temperature dependent resonance lines include, for example, those obtained from the proton resonance in hydroxyl groups of samples under analysis. Thus, before the resonance spectra of samples containing such temperature dependent lines may be compared for analysis, it is important to precisely determine the temperature at which the spectrum was run.

Figure 2:
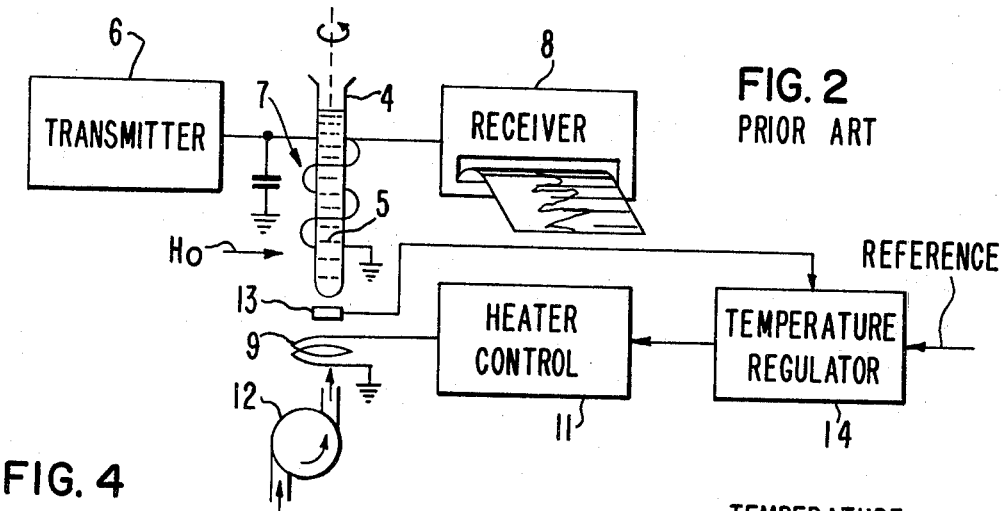
FIG. 2 is a schematic block diagram of a prior art spectrometer employing a closed loop temperature control circuit.

Referring now to FIG. 2 there is shown a typical prior art gyromagnetic resonance spectrometer employing the prior art temperature regulator. More specifically, the spectrometer includes a sample container 4 such as a glass vial containing a sample 5 to be analyzed. The sample container 4 is immersed in a polarizing magnetic field $H_0$ and excited into gyromagnetic resonance by means of an alternating magnetic field applied at right angles to the polarizing magnetic field. The alternating magnetic field is derived from a radio frequency transmitter 6 applying radio frequency energy to a resonant circuit 7 tuned to the gyromagnetic resonance radio frequency of the sample 5 to be analyzed. A radio frequency receiver 8 is coupled to the tuned circuit 7 and receives the resonance signals emanating from the sample 5 and displays the signals as a function of time or as a function of a scan of the polarizing magnetic field $H_0$ to produce the output spectrum, as shown in FIG. 1. A heating element 9 is supplied with heating current from a heater control unit 11. The heating element 9 heats an air stream, derived for an air pump 12 and passed over the sample container 4 for heating the sample to the temperature of the air stream. A temperature sensing element 13 is disposed in the air stream for sensing the temeprature of the air and, thus, indirectly the temperature of the sample 5. The output of the sensor 13 is fed to a temperature regulator 14 such as a bridge wherein the temperature signal is compared with a reference signal to derive an output signal which is fed to the heater control 11 for controlling the temperature of the heater 9 to cause the temperature of the sample 5 to assume a temperature as determined by the reference input signal. The problem with this prior art arrangement is that the temperature sensor 13 is disposed approximately an inch away from the sample 5 and as a consequence the temperature sensed by sensor 13 is often not the precise temperature of the sample 5. Therefore, output spectra from the spectrometer are not directly comparable as regards the temperature dependent lines of the sample due to the imprecise control over the temperature of the sample under analysis.

Figure 4:
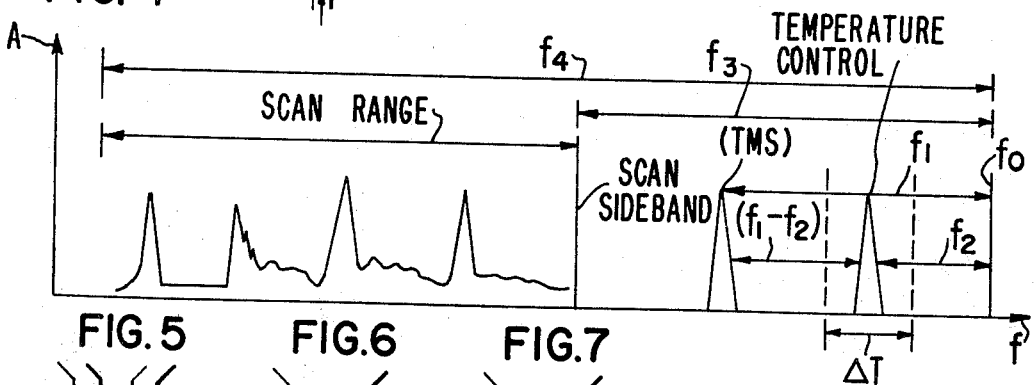
FIG. 4 is a gyromagnetic resonance spectrum depicting resonance lines of a field-frequency control line, temperature reference control line, and sample under analysis.
Figure 3:
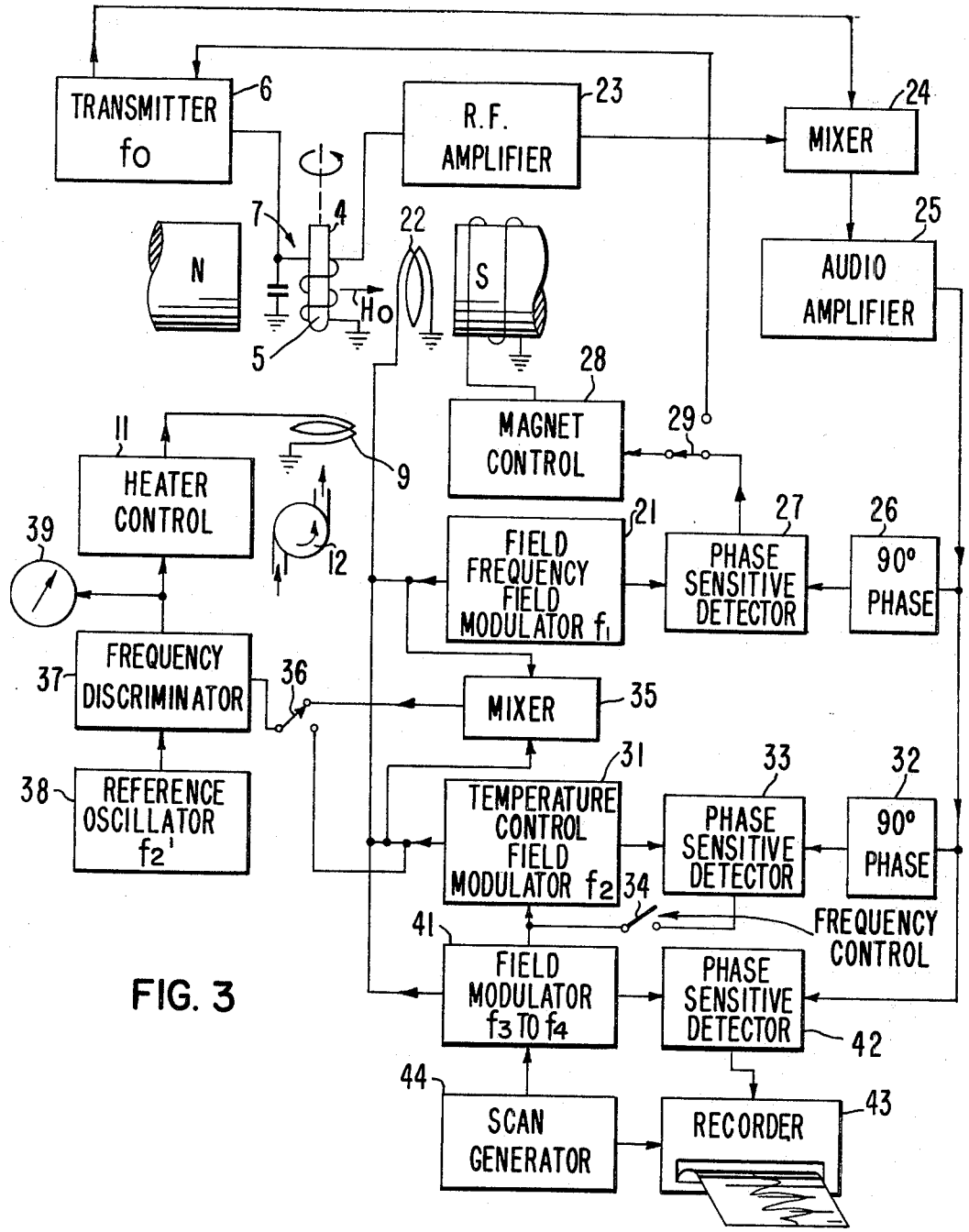
FIG. 3 is a schematic block diagram of a gyromagnetic resonance spectrometer employing temperature sensing and control features of the present invention.

Referring now to FIGS. 3 and 4 there is shown a gyromagnetic resonance spectrometer including the temperature sensing and control feature of the present invention.

The spectrometer is similar to that shown in FIG. 2 except that the sample 5 now contains a field-frequency control group of gyromagnetic bodies such as, for example tetramethylsilane (TMS) and a temperature dependent reference group of gyromagnetic bodies, such as an OH group, as well as the sample under analysis. The transmitter 6 applies a radio frequency magnetic field to the sample 5 at a reference radio frequency $f_0$ which is near the resonance frequencies of the various groups within the sample container 4 (See FIG. 4). A field-frequency field modulator 21 operating at a suitable audio frequency, such as 2 kHz., supplies its output to a field modulation coil 22 for modulating the polarizing field $H_0$ at the frequency $f_1$ to produce a sideband at $(f_0-f_1)$ for exciting resonance of the field-frequency control group (TMS). Radio frequency resonance signals emanating from the field-frequency control group within the sample 5 are picked up in the resonant circuit 7 and fed to a radio frequency amplifier 23 wherein they are amplified and fed to one input of a mixer 24 for mixing with a sample of the transmitter signal $f_0$ to produce an audio output resonance signal as the field frequency field modulation frequency $f_1$. This audio signal is amplified in audio amplifier 25 and fed via a 90° phase shifter 26 to one input of a phase sensitive detector 27, operating in the dispersive mode of the field-frequency resonance, for comparison with a sample of the field-frequency field modulation signal at $f_1$ to produce a D.C. dispersive mode output signal of a phase and mangitude to control the ratio of the frequency $f_0$ of transmitter 6 to the intensity of the D.C. polarizing field $H_0$ to sustain resonance of the field-frequency control group (TMS). This control signal at the output of phase sensitive detector 27 may be fed via switch 29 to a magnet control circuit 28 for controlling the intensity of the polarizing magnetic field $H_0$ or, alternatively, the output of the phase sensitive detector 27 may be fed via switch 29 to control the frequency $f_0$ of the transmitter 6. Thus, the field-frequency field modulator 21 and the field-frequency reference group (TMS) together with their associated circuitry serve to lock the spectrometer to the resonance of the TMS line and to compensate for any minute fluctuations in the frequency of the transmitter $f_0$ or in the intensity of the polarizing magnetic field $H_0$.

A temperature control field modulator 31, at a second audio frequency $f_2$, feeds its output to the field modulation coil 22 to produce a sideband of the transmitter signal $f_0$ at $(f_0-f_2)$ corresponding with the resonant frequency of the temperature control group within the sample 5. Typically the resonant frequency of (TMS) is to the high field side of the temperature control group but is shown for the sake of explanation at a slightly lower field value. Resonance signals emanating from the temperature control group are amplified in radio frequency amplified 23 and mixed in mixer 24 with a sample of the transmitter signal $f_0$ to obtain an audio frequency resonance output at the temperature control field modulation frequency $f_2$. The output of the mixer at $f_2$ is amplified in audio amplifier 25 and fed via a 90° phase shifter 32 to one input of a phase sensitive detector 33 wherein it is compared with a sample of the temperature control field modulation frequency $f_2$ to obtain a D.C. dispersive mode error signal fed via switch 34 to the field modulator 31 for controlling the frequency thereof to sustain resonance of the temperature control group.

The outputs of the field-frequency field modulator at $f_1$ and the temperature control field modulator at $f_2$ are mixed in a mixer 35 to derive a difference frequency $(f_1-f_2)$ which is determinative of the temperature of the sample 5. The output of mixer 35 is fed via switch 36 to a frequency discriminator 37 wherein the difference frequency is compared with a reference frequency $f_2'$ derived from reference oscillator 38 to derive a D.C. error signal having a phase and magnitude dependent upon the difference in the temperature of the sample from a reference temperature as determined by the frequency of the reference oscillator 38. The output error signal from the frequency discriminator 37 is fed to heater control 11 for controlling the temperature of the heater 9 to cause the sample 5 to assume the temperature dictated by the reference oscillator 38. The output of the frequency discriminator 37 is also fed to a temperature indicator 39 for indicating the temperature of the sample 5. The temperature indicator 39 indicates the error or the difference in temperature of the sample 5 from the temperature as indicated by the setting of the reference oscillator 38. Thus, a precise measurement of the temperature of the sample 5 is obtained by combining the reading from the reference oscillator 38 with the reading from the error indicator 39.

As an alternative to use of the mixer 35, switch 36 may be set to sample the frequency of the temperature control field modulator at $f_2$. This signal is then compared in the frequency discriminator 37 with the reference oscillator 38 to derive the error signal for controlling the temperature of the sample.

The sample under analysis is excited into resonance by means of a third field modulator 41 which is variable in frequency over a range from $f_3$ to $f_4$. The output of the field modulator 41 is fed to the field modulation coil 22 to produce a scan sideband $(f_0-f_3$ to $f_4)$ for exciting resonance of the sample under analysis. The R.F. resonance of the sample under analysis is picked up and fed to R.F amplifier 23 wherein it is amplified and fed to one input of mixer 24. In the mixer 24, the resonance of the sample under analysis is mixed with a sample of the transmitter signal $f_0$ to obtain an audio frequency resonance signal of the sample under analysis. The audio output of mixer 24 is amplified in audio amplifier 25 and fed to one input of a phase sensitive detector 42 for comparison with a sample of the signal derived from field modulator 41 to produce an output resonance signal which is fed to a recorder 43 for recording as a function of a scan signal derived from a scan generator 44 which also serves to scan the frequency of the field modulator 41 through the resonances of the various resonant lines of the sample under analysis.

The advantage of the spectrometer of FIG. 3 is that an extremely precise control over the temperature of the sample under analysis is obtained such that output spectra can be accurately calibrated in terms of temperature. This permits direct comparison of one output spectrum with another output spectrum to ascertain temperature shifts or for comparing spectra from different samples at precisely the same temperature. The spectrometer of FIG. 3 may also include the temperature sensor 13 and regulator 14 of FIG. 2 in combination with the temperature reference control group for sensing and controlling the temperature when the sample container 4 is removed.

Figure 5:
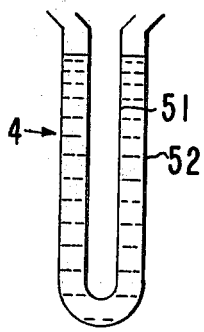
FIG. 5 is an enlarged cross-sectional view of an alternative sample container portion of the spectrometer of FIG. 3, and FIG. 6 and FIG. 7 depict alternative sample containers to that as depicted in FIG. 5.
Figure 6:
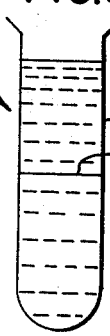
Figure 7:
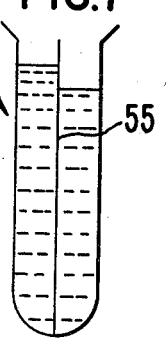

Referring now to FIGS. 5, 6 and 7 there are shown alternative sample containers 4. In the sample container, as previously described with regard to FIG. 3, it was assumed that the field-frequency reference group, the temperature reference group, and the sample under analysis were all inter-mixed in the same container 4. This is practical when these various groups do not interact with each other in a manner which would interfere with proper operation of the system. However, when analyzing certain reactive samples, it is desirable to provide means for separating the sample under analysis from the field-frequency and temperature control reference groups. In such a case, separate sample compartments are provided as indicated in FIGS. 5–7. In FIG. 5 the sample under analysis is disposed in a first cylindrical container 51 and the field-frequency and temperature control groups are disposed in a concentric outer cylindrical container 52. In FIG. 6, the sample container 53 includes a transverse partition 54 separating the sample container into two axially-spaced cylindrical compartments. The sample under analysis is disposed in one of the compartments and the control groups are disposed in the other compartment. In FIG. 7, the sample container 4 includes a longitudinally directed transverse partition 55 separating the container into two semi-cylindrical compartments. The sample is disposed in one compartment and the reference groups are disposed in the other compartment. In all the various embodiments, it is preferred that the sample be spun about the longitudinal axis to average out gradients in the magnetic field which are transverse to the spinning axis. In the sample containers of FIGS. 3 and 5–7, the reference groups and the sample under analysis are juxtapositioned in heat exchanging relation with each other. In the sample container 4 of FIG. 3, the temperature reference group is juxtapositioned with the sample under analysis by intermixing.

Since many changes could be made in the above construction and apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyromagnetic resonance spectrometer means for applying an alternating magnetic field to a sample under analysis disposed in a polarizing magnetic field to excite radio frequency gyromagnetic resonance of the sample of matter under analysis, means for detecting excited radio frequency resonance of the sample, means for applying an alternating magnetic field to a temperature dependent gyromagnetic resonance reference group of gyromagnetic bodies disposed in heat exchanging relation with the sample under analysis to excite gyromagnetic resonance of the temperature reference group, means for detecting resonance of the temperature reference group, means for applying an alternating magnetic field to a field-frequency reference group of gyromagnetic bodies disposed in the polarizing magnetic field to excite radio frequency gyromagnetic resonance of the field-frequency reference group, means for detecting resonance of the field-frequency reference group, means responsive to detected resonance of the field-frequency reference group for controlling the ratio of the frequency of the resonance exciting fields to the intensity of the polarizing magnetic field for both the temperature and the field-frequency resonance groups to sustain resonance in the field-frequency reference group and to compensate for minute fluctuations in the frequency of the resonance exciting fields and in the intensity of the polarizing field, the improvement comprising, means responsive to the detected resonance of the temperature reference group for controlling the frequency of the applied alternating magnetic field for exciting resonance of the temperature reference group to lock the spectrometer onto a resonance of the temperature reference group, and means for comparing the frequency of an alternating magnetic field which excites resonance of the field-frequency reference group with the frequency of an alternating field which excites resonance of the temperature reference group to derive an output indicative of the temperature of the sample under analysis.

2. The apparatus of claim 1 including means responsive to the output indicative of the temperature of the sample under analysis for controlling the temperature of the sample.

3. The apparatus of claim 2 wherein said means responsive to the temperature output for controlling the temperature of the sample under analysis includes means for comparing the temperature dependent output with a reference to derive an error signal for controlling the temperature of the sample to a temperature determined by the reference signal.

4. The apparatus of claim 3 wherein the reference signal is a reference frequency.

References Cited

UNITED STATES PATENTS

| 2,864,995 | 12/1958 | Shoolery | 324—0.5 |
| 2,911,587 | 11/1959 | Bayly | 324—0.5 |
| 3,373,348 | 3/1968 | Vanier | 324—0.5 |

OTHER REFERENCES

Richard Duerst and Andre Merbach: Accurate NMR Temperature Measurements, The Review of Scientific Instruments, p. 1896, December 1965.

Fillipo Conti: Simultaneous Temperature Measurements In High Resolution NMR Experiments, The Review of Scientific Instruments, p. 128, January 1967.

GERALD R. STRECKER, Primary Examiner

MICHAEL J. LYNCH, Assistant Examiner